United States Patent
Petzold et al.

(10) Patent No.: US 12,153,063 B2
(45) Date of Patent: Nov. 26, 2024

(54) MICROMECHANICAL INERTIAL SENSOR

(71) Applicant: Robert Bosch GmbH, Stuttgart (DE)

(72) Inventors: Klaus Petzold, Reutlingen (DE); Reinhold Wolpert, Neuenstadt (DE); Sebastian Guenther, Tuebingen (DE); Zoltan Szkupien, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 3 days.

(21) Appl. No.: 17/736,527

(22) Filed: May 4, 2022

(65) Prior Publication Data
US 2022/0357357 A1  Nov. 10, 2022

(30) Foreign Application Priority Data
May 10, 2021 (DE) .................. 10 2021 204 681.9

(51) Int. Cl.
*G01P 15/08* (2006.01)
*G01P 15/125* (2006.01)

(52) U.S. Cl.
CPC ........ *G01P 15/0888* (2013.01); *G01P 15/125* (2013.01)

(58) Field of Classification Search
CPC .................................................. G01P 15/0888
USPC ....................................................... 73/514.01
See application file for complete search history.

(56) References Cited

U.S. PATENT DOCUMENTS

2013/0345901 A1* 12/2013 Maeda ................... G01P 15/00
                                                                  701/1
2019/0360809 A1* 11/2019 Kabasawa ............... G01P 15/18

FOREIGN PATENT DOCUMENTS

DE    102017222656 A1    6/2019
GB          2146775 A *  4/1985 ............. G01P 15/08

* cited by examiner

*Primary Examiner* — Walter L Lindsay, Jr.
*Assistant Examiner* — Philip T Fadul
(74) *Attorney, Agent, or Firm* — NORTON ROSE FULBRIGHT US LLP; Gerard A. Messina

(57) ABSTRACT

A micromechanical inertial sensor. The inertial sensor includes a first sensor element for measuring an inertial variable in a first frequency band, and a second sensor element for measuring a periodic acceleration in a second frequency band. The second frequency band is at least partially above the first frequency band.

7 Claims, 2 Drawing Sheets

MICROMECHANICAL INERTIAL SENSOR

FIELD

The present invention is directed to a micromechanical inertial sensor including a first sensor element for measuring an inertial variable in a first frequency band.

BACKGROUND INFORMATION

MEMS inertial sensors (rotation rate and acceleration sensors) have been well-established in many safety applications in the motor vehicle for quite some time and have meanwhile also found their way into many everyday products, such as smart phones.

One problem that may occur with almost all applications are external vibration interferences which occur outside the sensor useful band. This may result in various undesirable sensor errors. For example, offset errors may occur in the signal, or the sensor element may be moved into the mechanical fixed stop and thus cannot carry out a reliable measurement of the linear acceleration or rotation rate. These states cannot always be detected by the sensor itself. The useful band of the sensor, also limited by the data processing in the ASIC, is usually lower than the frequency band of the interference signals.

As a result, it is examined very closely during the development and application of the sensor which interferences may occur at the selected installation location. The surroundings of the sensor are thus closely examined for interference sources and adapted, so that a reliable operation of the sensor may be ensured. This is a very time-consuming and costly process.

If defects occur at the installation location of the sensor which cause high vibration signals, such as, for example, engine or transmission damage, they can be examined only poorly, or not at all, during the development phase.

SUMMARY

It is an object of the present invention for the sensor itself to be able to recognize these high accelerations, and to possibly activate a suitable compensation of the sensor signal, or, in the case of a mechanical overload at the stop, to deliberately identify the sensor signal as not usable.

The present invention relates to a micromechanical inertial sensor including a first sensor element for measuring an inertial variable in a first frequency band, and including a second sensor element for measuring a periodic acceleration signal in a second frequency band, the second frequency band being at least partially above the first frequency band.

In accordance with the present invention, integrate a further sensor element, in addition to the usually very precise low-g sensor elements, is integrated for measuring high accelerations having high bandwidths into the MEMS sensor. This may either take place on the same MEMS chip or on a second MEMS chip, preferably in the same housing.

One advantageous example embodiment of the present invention provides that the first sensor element is configured to measure the inertial variable in a first detection direction, and that the second sensor element is configured to measure the periodic acceleration in the first detection direction.

One advantageous example embodiment of the present invention provides that the first sensor element is an accelerometer which is configured to measure smaller accelerations than the second sensor element.

Another advantageous example embodiment of the present invention provides that the first sensor element is a rotation rate meter.

In accordance with an example embodiment of the present invention, it is also advantageous that the sensor includes a signal processing unit, which is configured to process a first measuring signal of the first sensor element and a second measuring signal of the second sensor element, and which is configured to output a first measuring signal which has been corrected and/or commentated based on the second measuring signal.

Interference accelerations above the useful band of the low-g sensor may be measured with the aid of the micromechanical inertial sensor according to the present invention. Advantageously, the measurement of the high-g sensor may be used to compensate for and reliably recognize signal errors, which occur in the signal of the low-g sensor, of signals within its measuring range, if the interference acceleration in the surroundings moves the low-g sensor outside the mechanical or electrical measuring range, and thus it is not possible to carry out a reliable measurement. In addition to monitoring the interference acceleration at the installation location, the low-g acceleration sensor may also be continuously monitored or subjected to a plausibility check by the high-g sensor and, if necessary, may recognize spontaneously occurring hardware defects. In this way, the safety of the overall system is increased. Moreover, mechanical changes on the vehicle which result in high mechanical vibrations or another misuse case may be recognized. The signals of the high-g sensor could, for example in a motorcycle, also be used for recognizing and evaluating an accident situation (eCall). The high-g signals are additionally available for further applications in the control unit.

Additionally, mechanical defects may be detected in the application at the motor vehicle or motorcycle, which generate high interference accelerations, such as, for example, an engine or transmission damage or an installation of problematic mechanical additional components. In particular, such randomly occurring defects in the application are very difficult to take into consideration during the development process. Here, the present invention enhances the safety of the overall system and simplifies the release process since the vibration surroundings are continuously monitored by the high-g sensor.

During the release process of the motor vehicle control units, the high-g sensors may additionally save costs since a complex installation of external reference sensors may be dispensed with in many cases, and the high-g data may be utilized directly here. In addition, a possible misuse of the sensor due to incorrect installation may be detected.

The interference acceleration for rotation rate sensors may also be ascertained and possibly be compensated for in the same manner. The frequency range to be detected would need to be adapted here and would also considerably exceed 10 kHz. Generally, this poses no problem. It is only necessary to take this into consideration in the design of the high-g channel. Since many sensors today are already available in the market as multi-channel devices including acceleration and rotation rate sensors in multiple spatial axes as IMU, the high-g pieces of information of the second sensor element would also be available to the rotation rate sensor.

DETAILED DESCRIPTION OF EXAMPLE EMBODIMENTS

Figure 1:
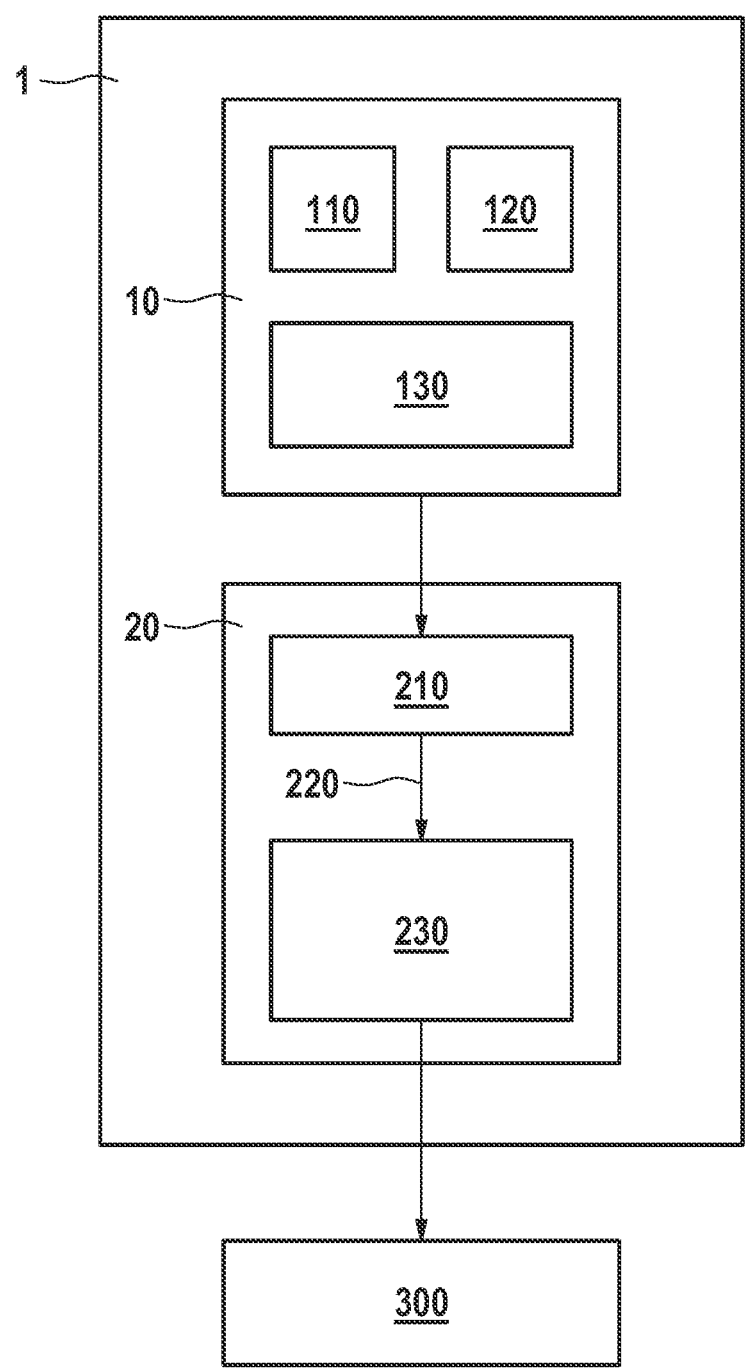
FIG. 1 schematically shows a low-g acceleration sensor in the related art.

FIG. 1 schematically shows a low-g acceleration sensor in the related art. An inertial sensor 1 is illustrated, here a three-channel low-g acceleration sensor including a MEMS chip 10 and an ASIC 20. First capacitive sensor elements 110, 120, 130 for low-g acceleration measurement in the spatial directions x, y, z are integrated on the MEMS chip. A first capacitance-to-voltage converter (C/V converter) 210 for generating a voltage corresponding to the present acceleration per channel is integrated on ASIC 20, which supplies a first measuring signal 220. Furthermore, a first signal processor 230 for signal processing is integrated, which is configured to output a low-g acceleration signal 300.

These sensors typically have bandwidths of 50 Hz to 400 Hz. The bandwidth is reduced by the ASIC to the desired degree to keep the noise of the sensor as low as possible. The typical bandwidth of the MEMS sensor element is 3 kHz to 5 kHz. In a range of 400 Hz to several kHz, it is thus possible to measure accelerations of the sensors which are not desirable for the useful signal (50 Hz to 400 Hz). These signals may result in sensor errors (signal bias) or in mechanical clipping of the sensor element. In the case of the sensor error, a good prediction about the magnitude of the sensor error may be made, having knowledge of the interference acceleration frequency and amplitude. Due to the PT2 behavior, the transfer function of the MEMS element rapidly decreases considerably above the resonance frequency of the MEMS element (f>10 kHz). Here, the MEMS element becomes immune toward interference accelerations. In a frequency range of 400 Hz to 10 kHz, knowledge of the present interference accelerations is very advantageous, first to compensate for the sensor signal in a part-specific manner with respect to sensor errors, and secondly to reliably detect the mechanical overload range of the sensor element.

Figure 2:
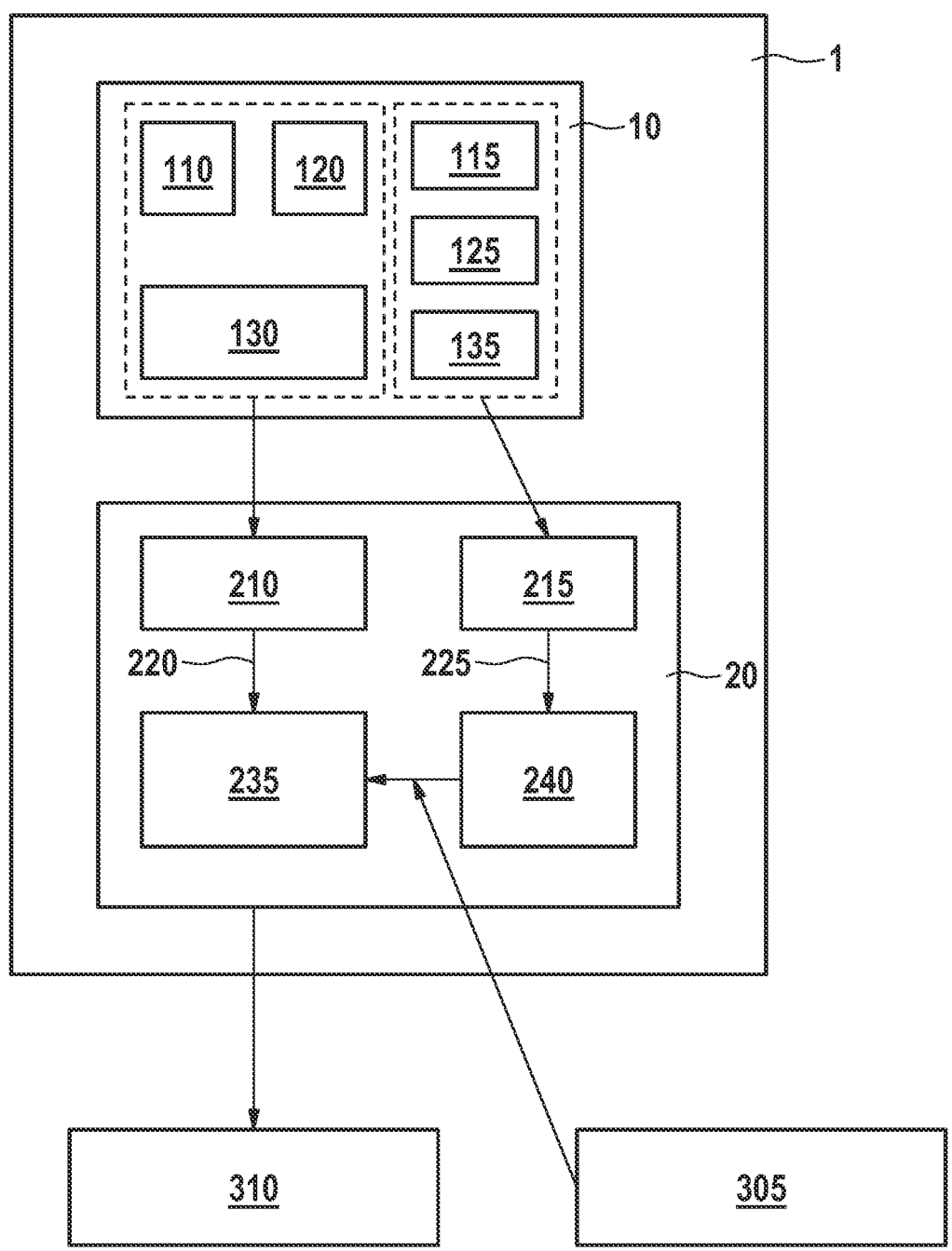
FIG. 2 schematically shows a micromechanical inertial sensor according to the present invention in a first exemplary embodiment, an acceleration sensor including vibration monitoring.

FIG. 2 schematically shows a micromechanical inertial sensor according to the present invention in a first exemplary embodiment, an acceleration sensor including vibration monitoring. In addition to the elements shown in FIG. 1, second capacitive sensor elements 115, 125, 135 for high-g acceleration measurements in spatial directions x, y, z are integrated on MEMS chip 10. The signals are measured and evaluated in ASIC 10 in parallel to the low-g signal.

For this purpose, a second capacitance-to-voltage converter (C/V converter) 215 for generating a voltage corresponding to the present acceleration per channel, which supplies a second measuring signal 225, is integrated on the ASIC. Furthermore, a second signal processor 240 for signal processing is integrated. In signal processor 240 of the high-g signal, it is now possible to analyze the positions of the interference frequencies and their amplitudes, for example with the aid of FFT, high-pass filter, low-pass filter, bandpass filter, . . . ) and to transfer them as pieces of information 305 about the interference spectrum to the DSP of the low-g part, a signal processor including signal correction 235. Here, a compensation of the offset signal may be carried out, or an overload indicator may also be set in the event of an excessive mechanical overload. Signal processor 235 then outputs a low-g acceleration signal 310, corrected or also supplemented by pieces of information regarding overload.

The detection of high-frequency interference signals (>10 kHz) may also be important, specifically for rotation rate sensors. Since they are oscillators having a high quality G, interference frequencies up to several 100 kHz may play an important role here.

LIST OF REFERENCE NUMERALS 1 micromechanical inertial sensor
10 MEMS chip
20 ASIC
110 x channel low-g acceleration sensor element
115 x channel high-g acceleration sensor element
120 y channel low-g acceleration sensor element
125 y channel high-g acceleration sensor element
130 z channel low-g acceleration sensor element
135 z channel high-g acceleration sensor element
210 first capacitance-to-voltage converter (C/V converter) low-g
215 second capacitance-to-voltage converter (C/V converter) high-g
220 first measuring signal
225 second measuring signal
230 first signal processor (low-g)
235 signal processor including signal correction
240 second signal processor
300 low-g acceleration signal
305 pieces of information about interference spectrum
310 low-g acceleration signal, corrected, supplemented by pieces of information regarding overload

The invention claimed is:

1. A micromechanical inertial sensor, comprising:
a first sensor element configured to measure an inertial variable in a first frequency band;
a second sensor element configured to measure a periodic acceleration in a second frequency band, the second frequency band being at least partially above the first frequency band; and
a signal processing unit including a first signal processor configured to process a first measuring signal of the first sensor element and a second signal processor configured to process a second measuring signal of the second sensor element, the second signal processor determining positions and amplitudes of frequencies in the second frequency band of the second measuring signal, and transmitting pieces of information identifying the positions and amplitudes of frequencies to the first signal processor.

2. The micromechanical inertial sensor as recited in claim 1, wherein the first sensor element is configured to measure the inertial variable in a first detection direction, and the second sensor element is configured to measure the periodic acceleration in the first detection direction.

3. The micromechanical inertial sensor as recited in claim 1, wherein the first sensor element is an accelerometer which is configured to measure smaller accelerations than the second sensor element.

4. The micromechanical inertial sensor as recited in claim 1, wherein the first sensor element is a rotation rate meter.

5. The micromechanical inertial sensor as recited in claim 1, wherein the signal processing unit is configured to output an output signal based on the first measuring signal which has been corrected as a function of the pieces of information identifying the positions and amplitudes of frequencies in the second measuring signal.

6. The micromechanical inertial sensor as recited in claim 1, wherein the signal processing unit is configured to output the first measuring signal which is commentated based on the pieces of information identifying the positions and amplitudes of frequencies in the second measuring signal.

7. The micromechanical inertial sensor as recited in claim 1, wherein the signal processing unit is configured to output the first measuring signal and an overload indicator, where the overload indicator indicates when a mechanical overload has occurred based on the pieces of information identifying the positions and amplitudes of frequencies in the second measuring signal.

\* \* \* \* \*